Nov. 15, 1932.  J. G. BATT  1,888,107
WATER CRAFT
Filed Oct. 22, 1931  7 Sheets-Sheet 2
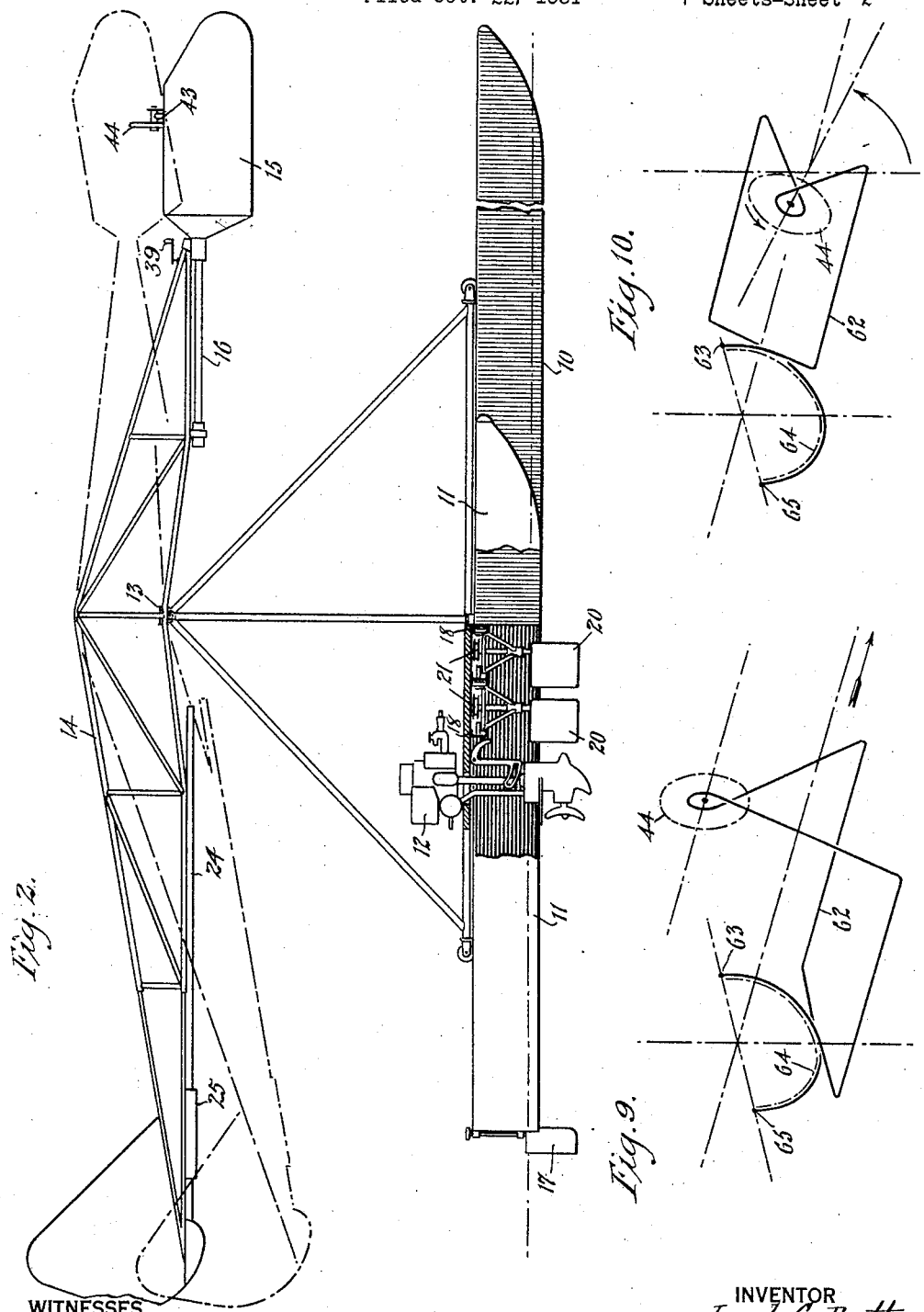
WITNESSES
INVENTOR
Jacob G. Batt
BY
Munn & Co
ATTORNEY

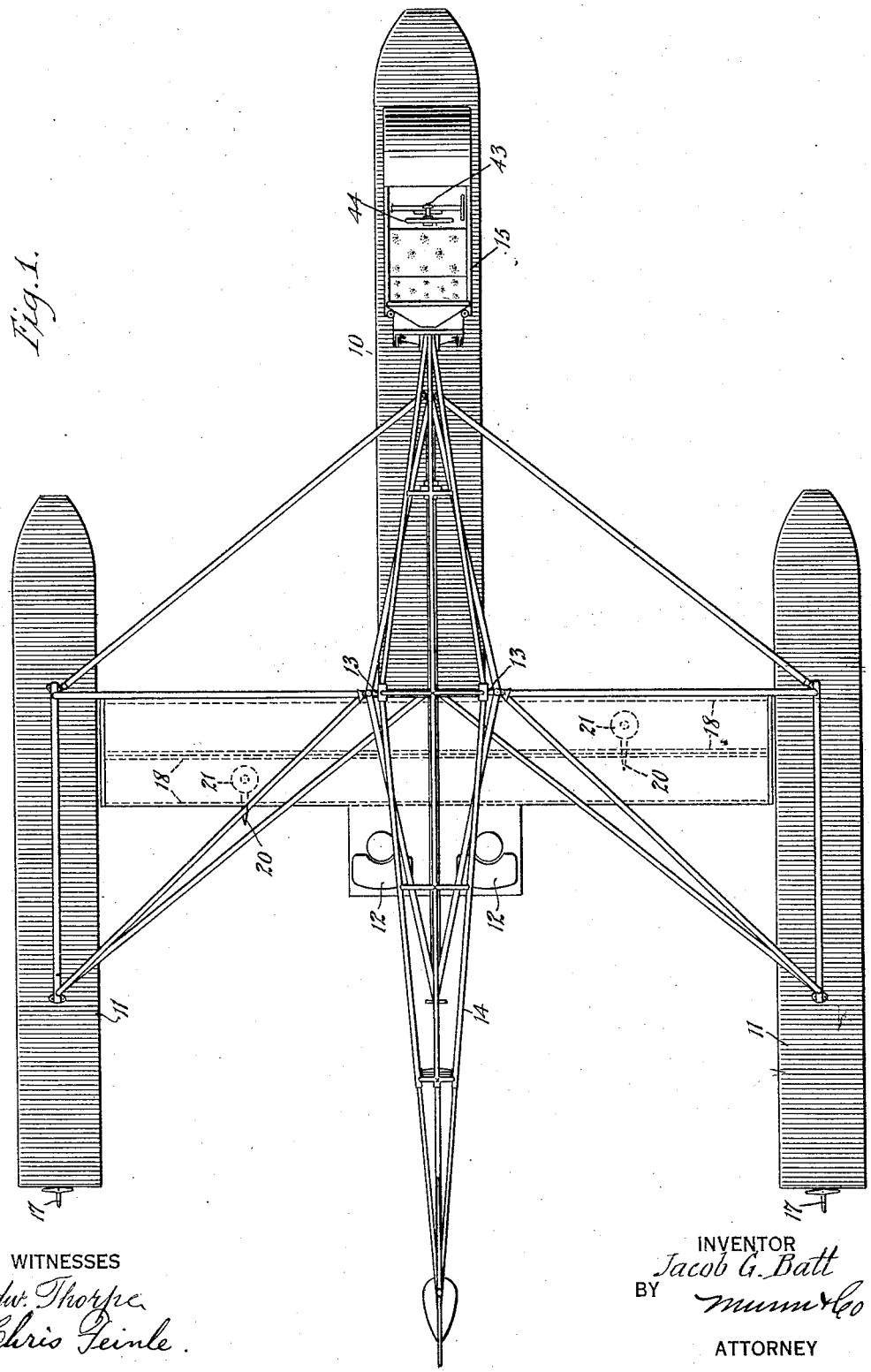

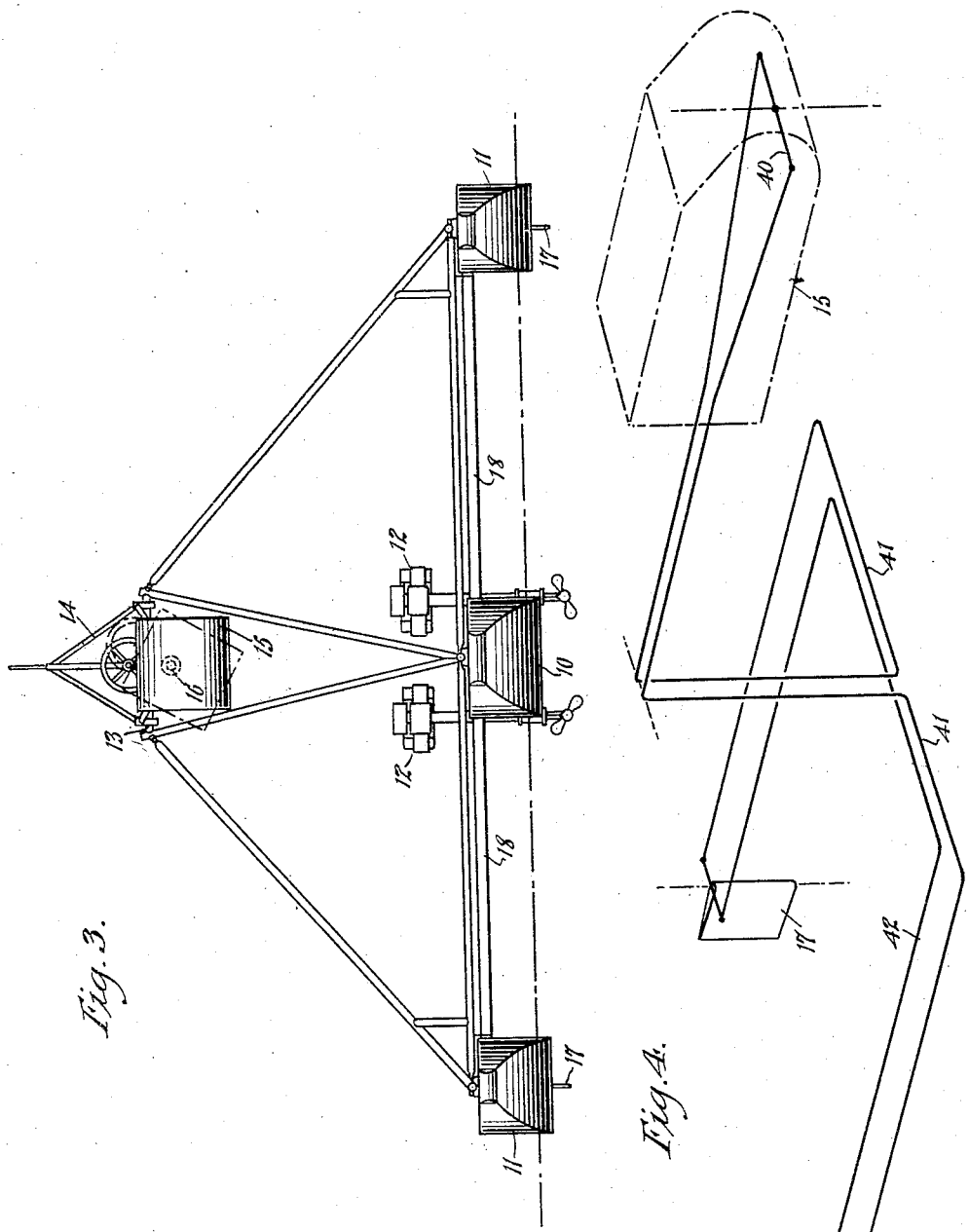

Nov. 15, 1932.  J. G. BATT  1,888,107
WATER CRAFT
Filed Oct. 22, 1931  7 Sheets-Sheet 4

WITNESSES
Edw. Thorpe
Chris Feinle

INVENTOR
Jacob G. Batt
BY Munn&Co
ATTORNEY

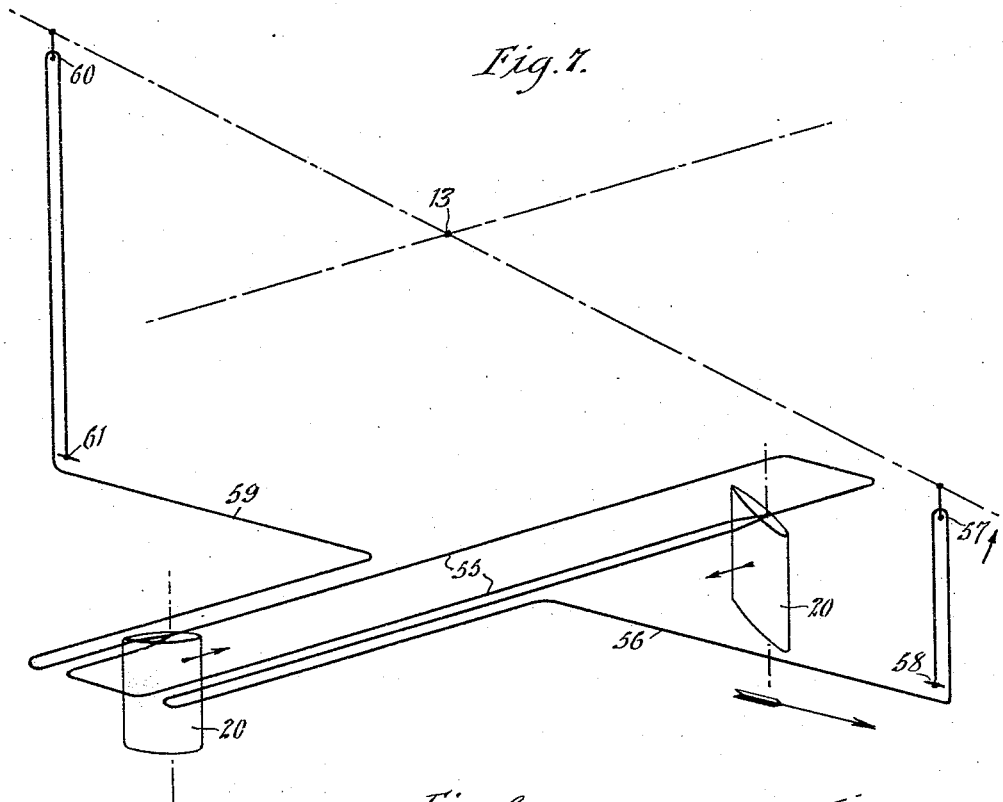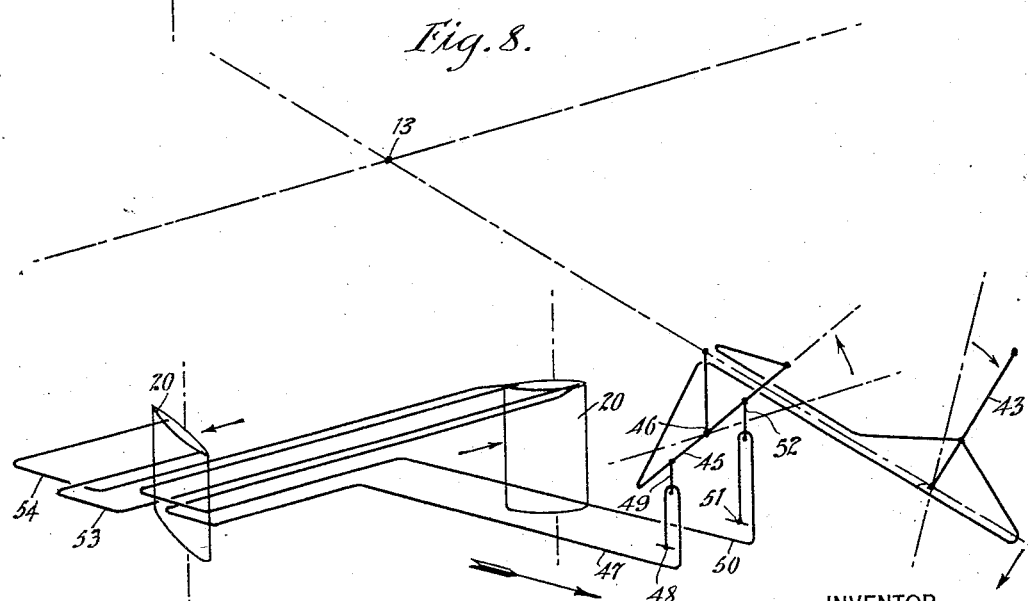

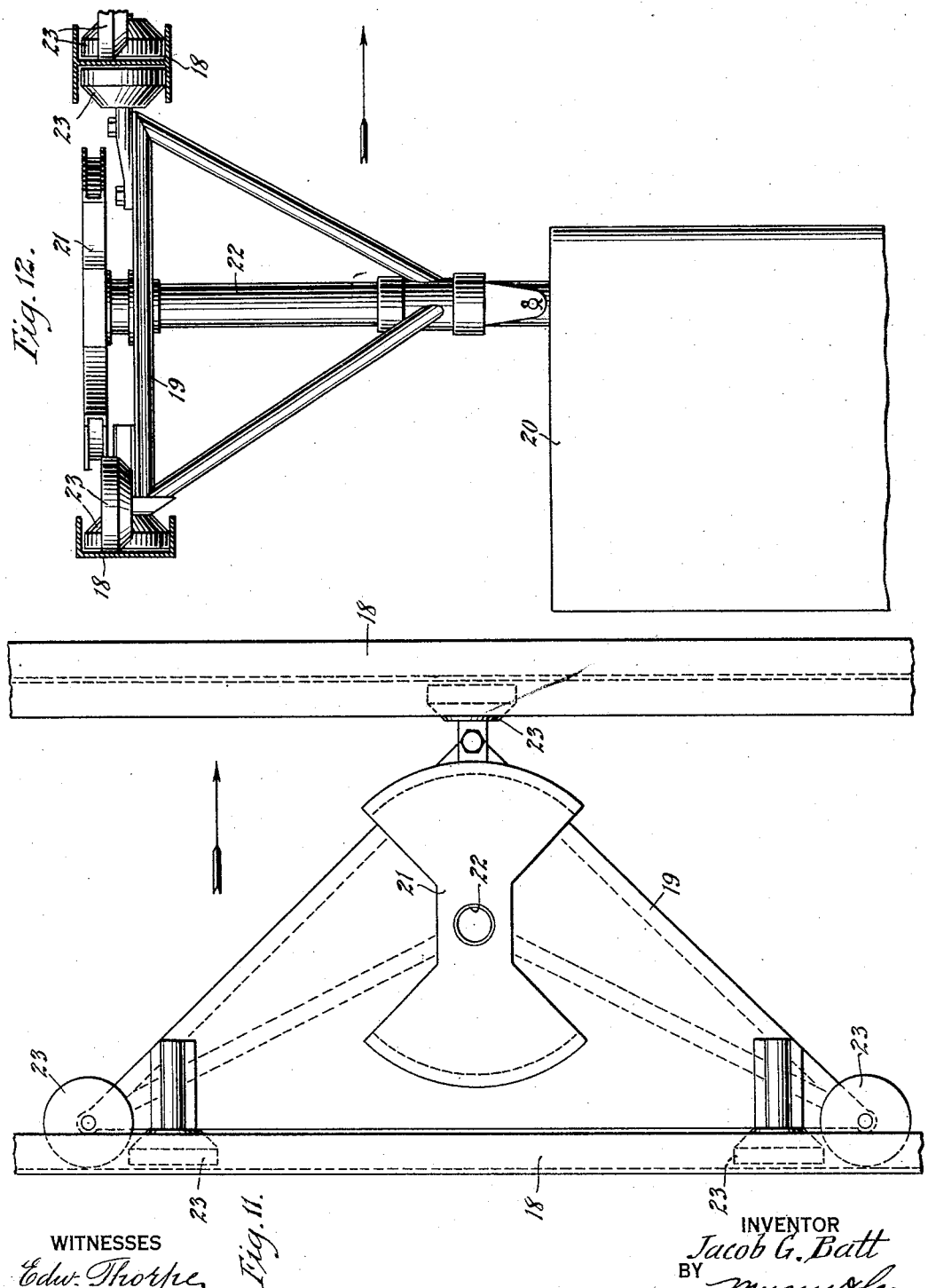

Nov. 15, 1932.  J. G. BATT  1,888,107
WATER CRAFT
Filed Oct. 22, 1931  7 Sheets-Sheet 7
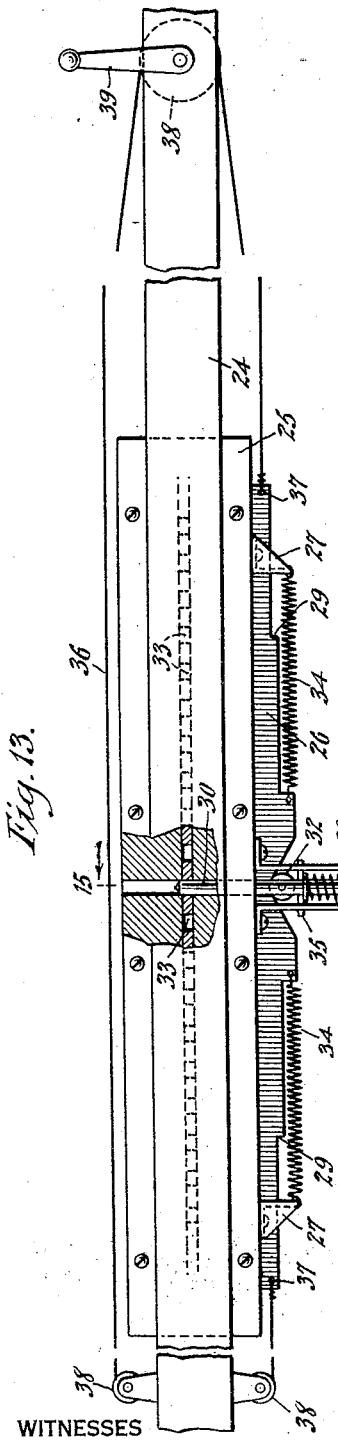
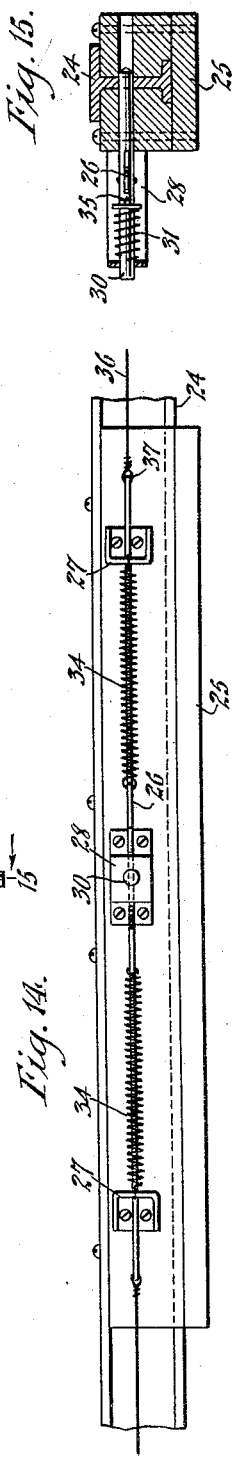
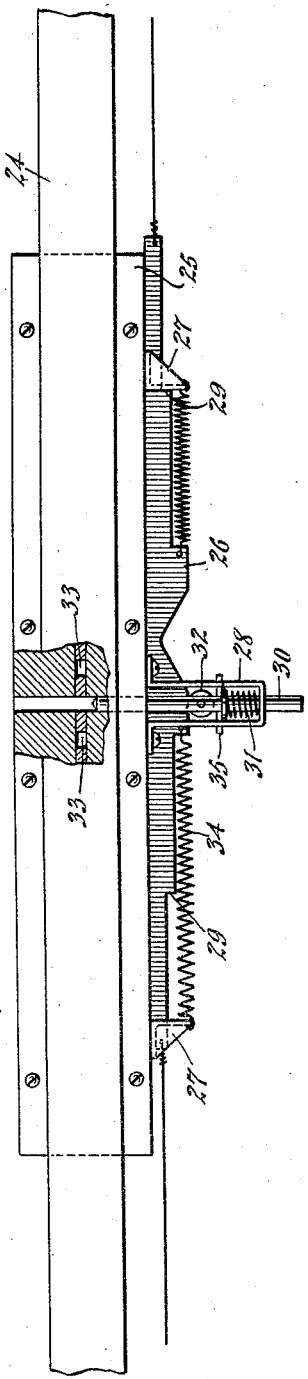
WITNESSES
Edw. Thorpe.
Chris Feinle.
INVENTOR
Jacob G. Batt
BY Munn & Co.
ATTORNEY Patented Nov. 15, 1932

1,888,107

UNITED STATES PATENT OFFICE

JACOB G. BATT, OF NEW YORK, N. Y., ASSIGNOR TO THE AMERICAN AQUAPLANE CO., OF MELROSE, CONNECTICUT, A CORPORATION OF CONNECTICUT

WATER CRAFT

Application filed October 22, 1931. Serial No. 570,477.

This invention relates to a pleasure craft which is designed and adapted to travel on water, and which embodies all of the desirable and characteristic features of an airplane without its danger and expense.

The principal object of the invention is the provision of a craft of the indicated character for one or more passengers and which is capable of control and susceptible to the dynamic action of water to give the sensations of flying, such as soaring, diving, banking and climbing, while the craft travels on a body of water.

With the foregoing and other objects in view the invention resides in the combination, relative disposition and operation of the elements without regard to details, it being understood that omissions and additions may be made, and that details may be modified and varied without departing from the spirit of the invention as expressed in appended claims.

In the drawings:

Figure 1 is a plan view of the craft;

Figure 2 is a side view, portions of the craft being broken away;

Figure 3 is a front view;

Figure 4 is a diagrammatic view of the rudder control means;

Figure 7 is a view similar to Figure 5, but illustrating a reverse relation of the parts;

Figure 8 is a view similar to Figure 6 but illustrating a reverse relation of the parts;

Figure 9 is a diagrammatic view of the passenger body control means;

Figure 10 is a view similar to Figure 9, but illustrating the manner in which the passenger body may be rocked to a "banked" position;

Figure 11 is an enlarged plan view of one of the fin assemblies;

Figure 12 is a side view of the assembly shown in Figure 11, the rails being shown in section and part of the fin being broken off;

Figure 13 is an enlarged plan of the counterbalancing assembly, portions thereof being broken away and others being shown in section;

Figure 14 is a side view of the assembly shown in Figure 13;

Figure 15 is a transverse section on the line 15—15 of Figure 13;

Figure 16 is a view similar to Figure 13, but showing how the latch bolt is withdrawn to permit adjustment of the counterweight.

Figure 5:
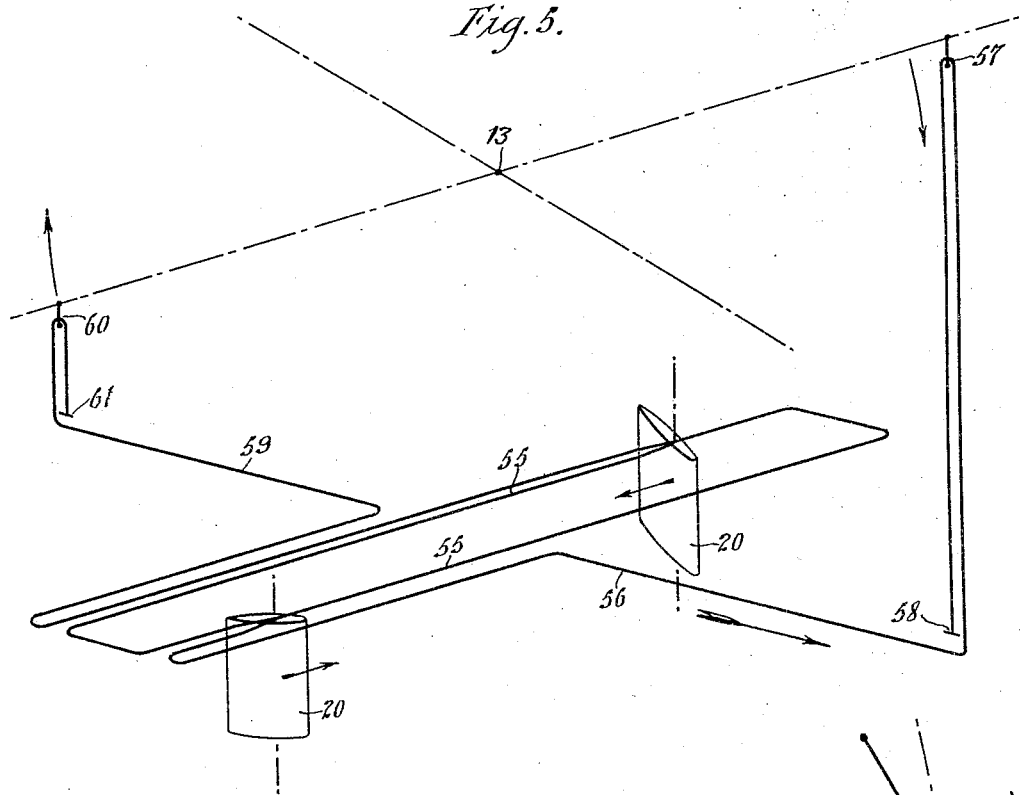
Figure 5 is a diagrammatic view of the means for rocking the superstructure, and illustrating one relation of the parts.

The craft of the present invention in the illustrated embodiment thereof includes a floatable structure adapted to travel on a body of water and consisting of a central hull or pontoon 10 and two hulls or pontoons 11 disposed respectively on opposite sides of the pontoon 10 and rigidly secured thereto in spaced relation in any practical manner. A suitable power plant carried by the floatable structure propels the craft. The power plant may consist of one or more engines, there being provided two engines 12 in the present instance which are mounted on a beam of the floatable structure. A superstructure is mounted for rocking movement on a transverse axis 13 on the floatable structure and consists of a framework streamline structure 14 and a passenger fuselage, nacelle or body 15, mounted forward on the structure 13 for rocking movement on a longitudinal axis 16. In order to steer the craft a rudder 17 is operatively mounted on the stern of each pontoon 11.

In order to cause the rocking movement of the superstructure to give the passengers the sensation of diving and climbing, there is provided means connected with the superstructure and responsive to the dynamic action of the water as the craft travels forwardly thereon. The said means comprises two hydrostatic or fin assemblies, one of which is shown most clearly in Figures 11 and 12. Each assembly travels on its own pair of rails or tracks 18. Each rail or track is in the form of a channel. The rails extend transversely between the pontoons 11 and are secured thereto in any practical manner. Each hydrostatic assembly comprises a traveler 19, a fin 20, a tiller 21 and a sectional arbor 22 rotatably mounted in any suitable manner on the traveler 19 and connecting the fin 20 with the tiller 21 so that the former will turn with the latter. The tiller 21 is disposed above the traveler 19 and the fin 20 is disposed a suitable distance below the traveler to be submerged in the water so that the water will act thereon. The traveler has an arrangement of rollers 23, certain of which rotate on vertical axes, and certain of which rotate on horizontal axes. These rollers roll in contact with the rails 18 to facilitate the movement of the traveler; to prevent binding action; and to neutralize the thrust imposed on the fin in the forward movement of the craft. The operation and purpose of the hydrostatic assemblies will be explained hereinafter.

One or more passengers will ride in the body 15 and in order to compensate for variation in the weight of a passenger or passengers, there is provided means presently to be described. A rail 24 is arranged longitudinally on the underside of the structure 14 aft of the axis 13. A counterbalancing weight 25 of sectional construction is movable in opposite directions along the rail 24. A cam 26 is associated with the weight 25 by brackets 27 and 28 secured to the weight so that the cam will move with and with respect to the weight. The cam 26 has shoulders 29 which are disposed to cooperate respectively with the brackets 27 which serve as abutments or stops to limit the sliding movement of the cam 26 in opposite directions relative to the weight 25 and to cause the weight and cam to move together in one direction or the other on the rail 24 according to the bracket 27 engaged. A latch bolt 30 is supported in part by the bracket 28 and the weight 25 for movement into and out of latching positions. A spring 31 surrounds the bolt 30 and is in engagement with the bolt and the bracket and serves to move the bolt to its latching position. The cam 26 extends through a slot in the bolt, and said cam acts on a roller 32 on the bolt to move the bolt against the action of the spring 31 out of the latching position upon the movement of the cam in relation to the weight 25. The rail 24 has a series of holes 33 therein, so that as the weight 25 is moved to positions of adjustment in relation to the rail, the bolt may be projected into any particular one of the holes to maintain the weight 25 in the adjusted position. Springs 34 are employed respectively in conjunction with the brackets 27 and the cam 26 to return it to its neutral position. One end of each spring 34 is connected with the related bracket 27 and its opposite end is connected with the cam. It will be apparent that the cam when moved in either direction will disengage the bolt 30 from the rail 24, and that in the further movement of the cam one of the shoulders 29 will encounter the related bracket 27, thereby causing the weight 25 to move with the cam to the desired adjusted position to counterbalance the weight in the body 15. The bolt 30 is prevented from turning by a pin 35 extending in slots in the bracket 28.

Control means are provided for operation by a passenger in the body 15, to adjust the weight 25; to steer the craft; to rock the superstructure; and to rock the body 15 relatively to the structure 14. For the sake of clearness the control means have been shown diagrammatically without regard to details which are not claimed.

The weight 25 is adjusted by the employment of a cable 36 whose opposite ends are respectively connected with the opposite ends of the cam 26, as at 37, and which passes around properly disposed pulleys 38 one of which has a crank 39 connected therewith to be manipulated to move the cable in opposite directions as required. The crank 39 will be disposed on the structure 14 conveniently accessible to the operator.

The steering rudders 17 will be operated simultaneously to similar positions by a rudder bar 40 in the body 15 and cables 41 each having one end connected with one end of the bar 40 and its other end connected with one end of the tiller of the related rudder 17; and a cable 42 has the opposite ends thereof respectively connected with the remaining ends of the tillers of the rudders 17. The cables 41 and 42 will be entrained over a suitable arrangement of pulleys (not shown).

A suitable control assembly such as is used in aircraft is positioned in the body 15, and consists of a pivoted element 43 which may be pushed forwardly and pulled rearwardly, and a wheel 44 carried by the element 43. The element 43 is manipulatable to control the fins 20. The wheel 44 is manipulatable to control the rocking movement of the body 15.

In order to change the angles of incidence of the fins 20 so as to cause one of them to move to the right and the other one to the left under the action of the water, as the craft travels forwardly, to rock the superstructure, to lower or raise the body 15, there is provided means as follows. A beam 45 is mounted for rocking movement on a longitudinal horizontal axis 46 on the structure 14. The element 43 is operatively connected with the beam 45 to rock it. A cable 47 has one end fixed, as at 48, to the floatable structure, and is connected, as at 49, with the beam 45 on one side of the axis 46, and the other end of the cable 47 is connected with the leading end of the forward fin 20. A cable 50 has one end fixed, as at 51, to the floatable structure, and is connected, as at 52, with the beam 45 on the other side of the axis 46, and the other end of the cable 50 is connected with the trailing end of the forward fin 20. The leading ends of the fins 20 are connected together by a cable 53, and the trailing ends of the fins 20 are connected together by a cable 54. It will be apparent that the fins 20 will move in unison on their axes, but to reversely angular positions. The fins 20 are connected together by cables 55 extending between points thereon coincidental with their axes, so that as one fin moves to the right and the other fin moves to the left, they will have constant and uniform movement.

A cable 56 has one end connected with the forward fin 20 at a point coincidental with the axis thereof, and is connected as at 57 with the superstructure at a point forward of the axis 13, and the other end of the cable 56 is fixed as at 58 to the structure 10. A cable 59 has one end connected with the rearward fin 20 at a point coincidental with the axis thereof, and is connected as at 60 with the superstructure aft of the axis 13, and the other end of the cable 59 is fixed as at 61 to the structure. It is to be understood that all of the cables will be entrained over a suitable arrangement of pulleys (not shown) on the superstructure and the floatable structure. The provision and arrangement is such that when the element 43 is pulled rearwardly, the fins 20 will be moved to a relatively diverging relationship, or, in other words, the angles of incidence of the fins 20 to the water will be such that the forward fin will move to the right of the craft, and the rearward fin will move to the left, to exert a pull on the cable 59 causing the superstructure to rock on the axis 13 in which the forward end having the body 15 will move upwardly. By pushing the element 43 forward the angles of incidence of the fins 20 will be changed causing the forward fin to move to the left and the rearward fin to move to the right as the craft is moving forward under the action of the water. This will impart a pulling force on the cable 56 thereby rocking the superstructure on the axis 13, with the result that the body 15 will move downwardly.

Figure 6:
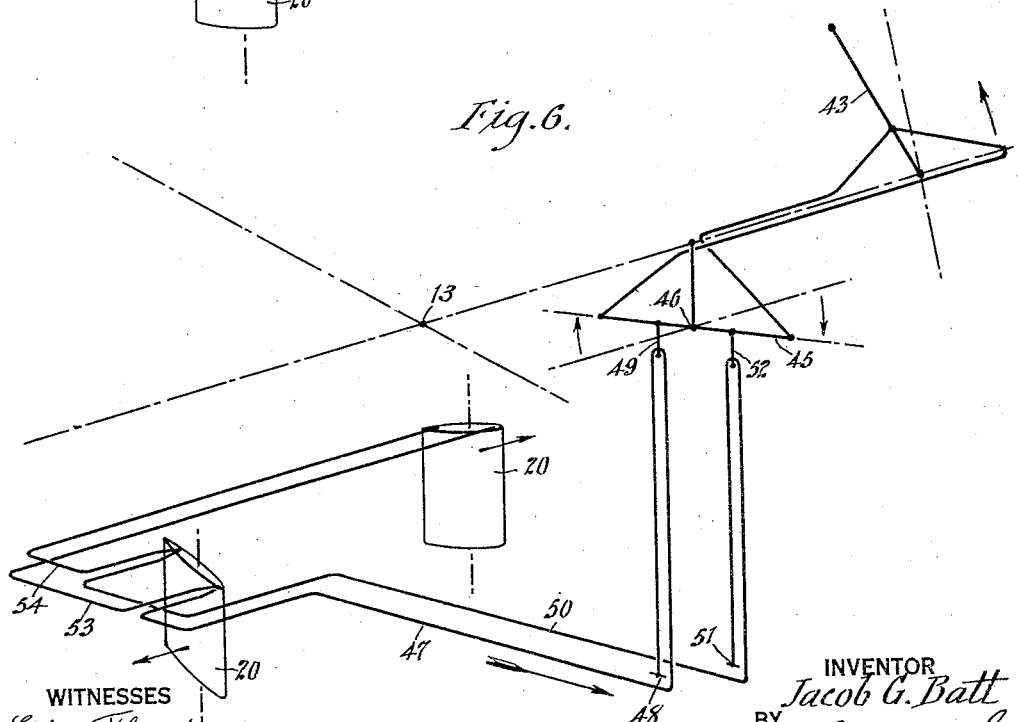
Figure 6 is a diagrammatic view of the fin control means, and illustrating one relation of the parts.

In Figure 5, the forward end of the superstructure is about to move downwardly, it being apparatus that the fins 20 diverge relatively to each other, if viewed from a point to the rear of the fins and looking forward of the craft. The forward fin will travel to the left and the rearward fin to the right with the result that a pull will be exerted on the cable 56 to rock the superstructure thereby lowering the body 15, while the cable 59 is paid out, to allow the rear end of the superstructure to rise. In Figure 6 the fins 20 have been set to cause the superstructure to rock to raise the body 15; the forward fin traveling to the right, and the rearward fin traveling to the left; and the element having been pulled rearwardly to set the fins in the relationship shown to cause their travel in the stated manner to rock the superstructure to raise the body 15. Figure 7 indicates that the forward end of the superstructure with the body 15 has been lowered and the fins 20 set to rock the superstructure to raise the body 15. Figure 8 indicates the forward end of the superstructure with the body 15 being lowered; the fins 20 being approximately at the end of their travel to cause the rocking of the superstructure to lower the body 15; and it being further indicated that the element 43 is pushed forwardly to accomplish this result.

In order to rock the body 15 on its axis 16 there is provided a cable 62 which has one end thereof connected as at 63 with one side of a semicircular sector 64 fixed on the structure 14, and is wound around a suitable sheave (not shown) connected with the wheel 44, and the other end of the cable 62 is secured as at 65 to the other side of the sector 64. It is to be understood that the cable 63 will be entrained over a suitable arrangement of pulleys on the body 15. It will be apparent that by turning the wheel 44 in one direction, the body 15 may be rocked to the right, as shown in Figure 10, and by rotating the wheel to the left, the body 15 may be rocked to the left. This may be accomplished while the body 15 is moving up or down. When the body 15 moves upwardly it will give to the passenger or passengers in the body 15 the sensation of soaring, and the sensation of diving when the body 15 moves downwardly. As the craft is steered to the right or left by operating the rudder bar 40, the body 15 may be rocked to the right or left and will give the sensation of banking and turning.

From the foregoing it will be apparent that the craft of the present invention is capable of reproducing the thrilling sensations received from flying, such as soaring, diving, banking, and climbing through the air while the craft remains in motion on the water.

It is to be understood that the engines may be under the control of an operator riding on the floatable structure 10, although a type of engine may be used having a remote control within the body 15.

Stability and ease of movement of the superstructure is obtained by reason of the fact that the disposition of the center of gravity of the superstructure is slightly below its axis 13.

Stability and ease of movement of the body 15 is obtained by reason of the fact that the disposition of the center of gravity of the body 15 is slightly below its axis 16.

The motion transmission means between the fins 20 and the superstructure is designed so as to greatly increase the effectiveness of the fins as they move in response to the pressure of the water thereon. Attention is also called to the fact that the provision of the fins and their manner of connection will react to the pressure of water on the fins, so as not to develop any turning tendency thereby keeping the craft directionally stable.

Claims:

1. In a marine craft, the combination of a floatable structure, a passenger carrying structure mounted for rocking movement on the floatable structure, and means under the control of a passenger and responsive to the pressure of the water as the craft moves therein, for the purpose of rocking said passenger carrying structure.

2. In a marine craft, the combination of a floatable structure, a passenger carrying structure mounted for rocking movement on a horizontal axis on the floatable structure, and means under the control of a passenger and responsive to the pressure of the water as the craft moves therein, for the purpose of rocking said passenger carrying structure.

3. In a marine craft, the combination of a floatable structure, a superstructure mounted on the floatable structure for movement in relation thereto, a passenger body on one end of said superstructure, and means under the control of a passenger and responsive to the pressure of the water as the craft moves therein, for the purpose of moving the superstructure in relation to the floatable structure.

4. In a marine craft, the combination of a floatable structure, a superstructure mounted on the floatable structure for movement in relation thereto, a passenger body on one end of said superstructure, means under the control of a passenger and responsive to the pressure of the water as the craft moves therein, for the purpose of moving the superstructure in relation to the floatable structure, and means on the floatable structure to propel the craft.

5. In a marine craft, the combination of a floatable structure, a superstructure mounted on the floatable structure for movement in relation thereto, a passenger body on one end of said superstructure, means under the control of a passenger and responsive to the pressure of the water as the craft moves therein, for the purpose of moving the superstructure in relation to the floatable structure, means on the floatable structure to propel the craft, and means under the control of the passenger to steer the craft.

6. In a marine craft, the combination of a floatable structure, a superstructure mounted on the floatable structure for movement in relation thereto, a passenger body on one end of said superstructure, means under the control of a passenger and responsive to the pressure of the water as the craft moves therein, for the purpose of moving the superstructure in relation to the floatable structure, means on the floatable structure to propel the craft, a rudder or rudders on the floatable structure, and means under the control of the passenger to operate the rudder or rudders to steer the craft.

7. In a marine craft, the combination of a floatable structure, a passenger carrying structure mounted for rocking movement on a longitudinal axis on the floatable structure, and means under the control of a passenger and responsive to the pressure of the water as the craft moves therein, for the purpose of rocking said passenger carrying structure.

8. In a marine craft, the combination of a floatable structure, a superstructure mounted on the floatable structure for movement in relation thereto, a passenger body mounted on the superstructure in relation thereto, means under the control of a passenger in said body to cause movement of the body, means under the control of the passenger and responsive to the pressure of the water as the craft moves therein, for the purpose of moving the superstructure, and means to propel the craft.

9. In a marine craft, the combination of a floatable structure, a superstructure mounted on the floatable structure for rocking movement, a passenger body on one end of said superstructure, and counterbalancing means on the other end of the superstructure.

10. In a marine craft, the combination of a floatable structure, a superstructure mounted on the floatable structure for rocking movement, a passenger body on one end of said superstructure, adjustable counterbalancing means on the other end of the superstructure, and means to adjust said counterbalancing means.

11. In a watercraft, the combination of a floatable structure having means to cause it to travel on a body of water, a passenger body mounted above said structure for rocking movement on an axis paralleling the longitudinal axis of said structure, and means adapted to be operated by a passenger in said body to rock said body.

12. In a water craft, the combination of a floatable structure, fins, and means mounting the fins for movement in the water transversely with respect to the longitudinal axis of said structure and also for pivotal movement to change the angles of incidence thereof.

13. In a water craft, the combination of a floatable structure, fins, means mounting the fins for movement in the water transversely with respect to the longitudinal axis of said structure and also for pivotal movement to change the angles of incidence thereof, means to cause the fins to move transversely in unison, a passenger carrying superstructure mounted on the floatable structure for rocking movement, means under the control of a passenger to change the angles of incidence of said fins to cause them to travel transversely under pressure of the water as the craft moves therein, and means connecting the fins with said superstructure to rock the latter in response to the transverse movement of said fins.

14. In a water craft, the combination of a floatable structure, fins, rails on said structure and arranged in spaced parallel relation to each other and extending transversely of the structure, means which travels along said rails with which said fins are connected to travel therewith and to pivot in relation thereto, means connected with the fins to change the angles of incidence thereof, simultaneously to a reverse relation with respect to each other by reason of their pivotal connections, and motion transmission means connected with and operated by said fins as the fins are forced to travel transversely of said structure by the force of pressure applied to said fins.

15. In a water craft, the combination of a floatable structure consisting of pontoons rigidly connected together in side by side spaced relation, fins, travelers with which said fins are pivotally connected respectively, means to cause one of said fins to move in response to the other, means supported by said pontoons and extending transversely therebetween on which said travelers have guided movement in opposite directions with the fins submerged in the water, means connected with the fins to change the angles of incidence thereof simultaneously to a reverse relation with respect to each other by reason of their pivotal connections, and motion transmission means connected with and operated by said fins as the fins are forced to travel in opposite directions by the force of the pressure of the water thereon in the forward motion of the craft.

16. In a marine craft, the combination of a floatable structure, a second structure mounted on the floatable structure above the same for movement in relation thereto, said second structure having means thereon to sustain and give a person the sensation of soaring, diving and climbing as the second structure is moved in relation to the floatable structure and while the latter is traveling on a body of water, and means responsive to the pressure of the water as the floatable structure travels on the water to cause the movement of the second structure.

17. In a marine craft, the combination of a floatable structure, a second structure mounted on the floatable structure above the same for movement in relation thereto, said second structure having means thereon to sustain and give a person the sensation of soaring, diving and climbing as the second structure is moved in relation to the floatable structure and while the latter is traveling on a body of water, means responsive to the pressure of the water as the floatable structure travels on the water, to cause the movement of the second structure, and manually operable means connected with the last mentioned means to control the operation of the latter.

18. In a marine craft, the combination of a floatable structure, a second structure mounted on the floatable structure above the same for movement on an axis extending transversely to the longitudinal axis of the floatable structure, means adapted to sustain a passenger or passengers mounted on the second structure for movement on an axis perpendicular to the axis of said second structure, means to cause the movement of the second structure, and means to cause the movement of the passenger sustaining means.

19. In a marine craft of the type described, the combination of a floatable structure adapted to be propelled on a body of water, a second structure mounted on an axis of the floatable structure above the same for rocking movement, said second structure having means thereon to sustain and give a person the sensation of soaring, diving and climbing upon movement of the second structure while the floatable structure is traveling on a body of water, the center of gravity of said second structure being slightly below its axis.

20. In a marine craft of the type described the combination of a floatable structure adapted to be propelled on a body of water, a second structure mounted on an axis on the floatable structure above the same for rocking movement, said second structure having means thereon to sustain and give a person the sensation of banking and turning upon movement of the second structure while the floatable structure is traveling on a body of water, the center of gravity of said second structure being slightly below its axis.

21. In a marine craft of the type described, the combination of a floatable structure adapted to be propelled on a body of water, means operatively mounted on said structure responsive to the pressure of water as the craft moves thereon to exert a working force, and transmission means operated by the first means and of such character as to increase the effectiveness of the first means.

22. In a marine craft of the type described, the combination of a floatable structure adapted to be propelled on a body of water, and means operatively mounted on said structure responsive to the pressure of water as the craft moves thereon to transmit motion and also exert a working force, said means being of such character as not to cause turning of the craft during the operation thereof.

JACOB G. BATT.